United States Patent
Amezawa et al.

(10) Patent No.: US 10,651,501 B1
(45) Date of Patent: May 12, 2020

(54) SOLID ELECTROLYTE AND FLUORIDE ION BATTERY

(71) Applicants: Koji Amezawa, Sendai (JP); Takashi Nakamura, Sendai (JP); Yuta Kimura, Sendai (JP); Yosuke Matsukawa, Sendai (JP); Kazuto Ide, Susono (JP); Takeshi Tojigamori, Susono (JP)

(72) Inventors: Koji Amezawa, Sendai (JP); Takashi Nakamura, Sendai (JP); Yuta Kimura, Sendai (JP); Yosuke Matsukawa, Sendai (JP); Kazuto Ide, Susono (JP); Takeshi Tojigamori, Susono (JP)

(73) Assignees: TOHOKU UNIVERSITY, Sendai-shi, Miyagi (JP); TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

(21) Appl. No.: 16/281,895

(22) Filed: Feb. 21, 2019

(30) Foreign Application Priority Data

Dec. 6, 2018 (JP) ................... 2018-229315

(51) Int. Cl.
*H01M 4/02* (2006.01)
*H01M 10/056* (2010.01)
*H01M 10/0585* (2010.01)

(52) U.S. Cl.
CPC ..... *H01M 10/056* (2013.01); *H01M 10/0585* (2013.01); *H01M 2300/0065* (2013.01); *H01M 2300/0091* (2013.01)

(58) Field of Classification Search
CPC ...................................................... H01M 4/02
See application file for complete search history.

(56) References Cited

U.S. PATENT DOCUMENTS

2012/0251871 A1 10/2012 Suzuki et al.
2017/0237067 A1* 8/2017 Miki ................. H01M 4/38
                                                429/220

FOREIGN PATENT DOCUMENTS

| JP | 2012-209106 A | 10/2012 |
| JP | 2017-143044 A | 8/2017 |
| JP | 2018-041673 A | 3/2018 |

* cited by examiner

*Primary Examiner* — Jacob B Marks
(74) *Attorney, Agent, or Firm* — Sughrue Mion, PLLC

(57) ABSTRACT

A main object of the present disclosure is to provide a solid electrolyte including excellent fluoride ion conductivity. The present disclosure achieves the object by providing a solid electrolyte including fluoride ion conductivity, the solid electrolyte comprising: a crystal phase having a perovskite structure or a layered perovskite structure; the crystal phase contains A cation positioned in A site, B cation positioned in B site, and a fluoride ion; the A cation contains $R_1R_2R_3R_4N^+$ cation (each of $R_1$ to $R_4$ is independently a hydrogen element or a hydrocarbon group with two or less carbon atoms) or a hydrocarbon cation with two or less carbon atoms; and the B cation contains a divalent metal cation and a monovalent metal cation.

7 Claims, 3 Drawing Sheets

SOLID ELECTROLYTE AND FLUORIDE ION BATTERY

TECHNICAL FIELD

The present disclosure relates to a solid electrolyte and a fluoride ion battery.

BACKGROUND ART

As high-voltage and high-energy density batteries, for example, Li ion batteries are known. The Li ion battery is a cation-based battery utilizing a Li ion as a carrier. Meanwhile, as anion-based batteries, fluoride ion batteries utilizing a fluoride ion as a carrier are known.

For example, Patent Literature 1 discloses a fluoride ion conductor containing at least one kind of $K_2MgF_4$ crystal phase and $Rb_2MgF_4$ crystal phase. Also, Patent Literature 2 discloses an active material used in a fluoride ion battery, the active material having a layered perovskite structure. Incidentally, although the technique is not related to a fluoride ion battery, Patent Literature 3 discloses an all solid lithium battery comprising a perovskite type fluoride ($MF_3$: M is either one of Fe, C, Ti, Co, and Mn) as an inorganic type cathode active material.

CITATION LIST

Patent Literatures

Patent Literature 1: Japanese Patent Application Laid-Open (JP-A) No. 2018-041673
Patent Literature 2: JP-A No. 2017-143044
Patent Literature 3 JP-A No. 2012-209106

SUMMARY OF DISCLOSURE

Technical Problem

For example, from the viewpoint of improving the performance of a fluoride ion battery, a solid electrolyte having excellent fluoride ion conductivity is required. The present disclosure has been made in view of the above circumstances, and a main object thereof is to provide a solid electrolyte having excellent fluoride ion conductivity.

Solution to Problem

In order to achieve the object, the present disclosure provides a solid electrolyte including fluoride ion conductivity, the solid electrolyte comprising: a crystal phase having a perovskite structure or a layered perovskite structure; the crystal phase contains A cation positioned in A site, B cation positioned in B site, and a fluoride ion; the A cation contains $R_1R_2R_3R_4N^+$ cation (each of $R_1$ to $R_4$ is independently a hydrogen element or a hydrocarbon group with two or less carbon atoms) or a hydrocarbon cation with two or less carbon atoms; and the B cation contains a divalent metal cation and a monovalent metal cation.

According to the present disclosure, specific cations are used as A cation and B cation so as to allow a solid electrolyte to have excellent fluoride ion conductivity.

In the disclosure, the A cation may comprise the $R_1R_2R_3R_4N^+$ cation.

In the disclosure, the divalent metal cation may comprise a cation of an alkali earth metal element.

In the disclosure, the monovalent metal cation may comprise a cation of an alkali metal element.

In the disclosure, the divalent metal cation may comprise $Mg^{2+}$ and the monovalent metal cation may comprise $Li^+$.

In the disclosure, a proportion of the monovalent metal cation to a total of the divalent metal cation and the monovalent metal cation may be 30 mol % or less.

The present disclosure also provides a fluoride ion battery comprising a cathode active material layer containing a cathode active material, an anode active material layer containing an anode active material, and a solid electrolyte layer formed between the cathode active material layer and the anode active material layer; and at least one of the cathode active material layer, the anode active material layer, and the solid electrolyte layer contains the above described solid electrolyte.

According to the present disclosure, usage of the above described solid electrolyte allows a fluoride ion battery to have, for example, excellent capacity properties.

Advantageous Effects of Disclosure

The solid electrolyte in the present disclosure exhibits an effect of having excellent fluoride ion conductivity.

DESCRIPTION OF EMBODIMENTS

Figure 1:
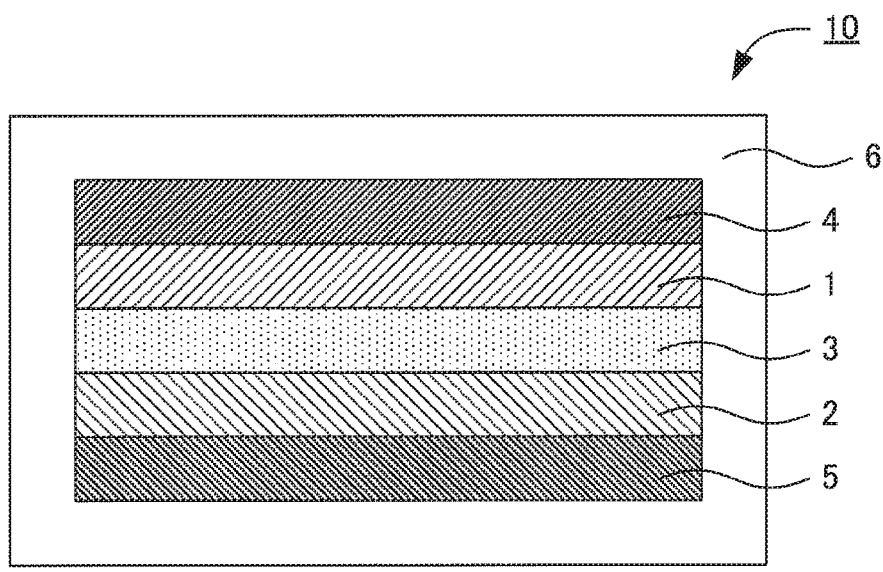
FIG. 1 is a schematic cross-sectional view illustrating an example of a fluoride ion battery in the present disclosure.

A solid electrolyte and a fluoride ion battery in the present disclosure will be hereinafter described in details.

A. Solid Electrolyte

The solid electrolyte in the present disclosure is a solid electrolyte including fluoride ion conductivity, the solid electrolyte comprises: a crystal phase having a perovskite structure or a layered perovskite structure; the crystal phase contains A cation positioned in A site, B cation positioned in B site, and a fluoride ion; the A cation contains $R_1R_2R_3R_4N^+$ cation (each of $R_1$ to $R_4$ is independently a hydrogen element or a hydrocarbon group with two or less carbon atoms) or a hydrocarbon cation with two or less carbon atoms; and the B cation contains a divalent metal cation and a monovalent metal cation.

According to the present disclosure, specific cations are used as A cation and B cation so as to allow a solid electrolyte to have excellent fluoride ion conductivity. For example, a fluoride ion conductor comprising $K_2MgF_4$ crystal phase is disclosed in Example 1 of Patent Literature 1; the ion conductivity is $1.1*10^{-8}$ S/cm at 200° C. Meanwhile, from the viewpoint of improving the performance of a fluoride ion battery, further improvement in the ion conductivity is desired.

The inventors of the present disclosure and the other have attempted to improve the ion conductivity from generally two perspectives. First, they have focused on acidity of cation in a crystal phase. In $K_2MgF_4$ crystal phase, $K^+$ (K element) is categorized as extremely hard acid in the HSAB theory. Meanwhile, in $K_2MgF_4$ crystal phase, $F^-$ (F element) is categorized as extremely hard base in the HSAB theory. Accordingly, in $K_2MgF_4$ crystal phase, $K^+$ forms strong bond with $F^-$; it may be a cause of preventing $F^-$ from conducting. Then, the inventors of the present disclosure and the other have used specific soft acid in A site where $K^+$ is positioned. Thereby, $F^-$ is easily conducted inside the crystal phase and thus the improvement of the ion conductivity may be achieved.

Secondly, they have focused on the proportion of F inside the crystal phase. It is presumed that the ion conductivity would seemingly improve more if the proportion of F inside the crystal phase were more. However, the phenomenon of $F^-$ (F element) conduction in detail has not been completely discovered; there is a possibility that the proportion of F being large inside the crystal phase may not always contribute to the improvement of the ion conductivity. Then, they have used a monovalent metal cation in addition to a divalent metal cation as B cation positioned in B site to introduce F defect in the crystal phase on purpose. In other words, a part of a divalent metal cation has been substituted with a monovalent metal cation to introduce the F defect as charge compensation. As the result, surprisingly, the improvement of the ion conductivity has been confirmed.

In the present disclosure, the mechanism of the improvement in the ion conductivity has not been completely clear; however, it is presumed that the usage of specific soft acid in A site has generated an environment where $F^-$ can be easily conducted inside the crystal phase, and in such an environment, F defect has been further introduced to the crystal phase on purpose and thus the hopping conduction of $F^-$ via the F defect has been caused to result in the improvement of the ion conductivity.

The solid electrolyte in the present disclosure comprises a crystal phase having a perovskite structure or a layered perovskite structure.

The crystal phase having a perovskite structure (perovskite type crystal phase) generally has a composition of $ABC_3$. In the composition, A and B are respectively a cation positioned in A site and B site, and C is an anion positioned in C site. In the present disclosure, specific cations are positioned in A site and B site, and a fluoride ion is positioned in C site. On the other hand, several kinds of crystal phases having a layered perovskite structure (layered perovskite type crystal phase) have been known, and a crystal phase (Ruddlesden-Popper type crystal phase) having $ABC_3$ layer (perovskite layer) and AC layer (rock salt layer) has been known. Similarly to the above, in the present disclosure, specific cations are positioned in A site and B site, and a fluoride ion is positioned in C site.

The solid electrolyte comprises a crystal phase having a perovskite structure or a layered perovskite structure. The solid electrolyte preferably mainly comprises the crystal phase having a perovskite structure or a layered perovskite structure. In specific, the proportion of the crystal phase to all the crystal phases included in the solid electrolyte is, preferably 50 mol % or more, more preferably 70 mol % or more, and further preferably 90 mol % or more. Also, the solid electrolyte may comprise the crystal phase having a perovskite structure or a layered perovskite structure as a single phase.

The solid electrolyte may (i) comprise the crystal phase having a perovskite structure and not comprise the crystal phase having a layered perovskite structure, (ii) comprise the crystal phase having a layered perovskite structure and not comprise the crystal phase having a perovskite structure, and (iii) comprise the crystal phase having a perovskite structure and also comprise the crystal phase having a layered perovskite structure.

The crystal phase having a perovskite structure preferably has typical peaks at $2\theta=21.97°$, $31.19°$, $38.42°$, $44.64°$, $50.230$, and $55.39°$ in an XRD measurement using a CuKα ray. Incidentally, these peak positions may be respectively shifted in the range of ±0.50°. The range may be ±0.30°, and may be ±0.10°.

The crystal phase having a layered perovskite structure preferably has typical peaks at $2\theta=12.80°$, $22.82°$, $29.29°$, $31.15°$, $33.79°$, $38.31°$, $40.81°$, $44.61°$, $46.59°$, $50.69°$, $52.84°$, and $54.28°$. Incidentally, these peak positions may be respectively shifted in the range of ±0.500. The range may be ±0.300, and may be ±0.10°.

The crystal phase contains $R_1R_2R_3R_4N^+$ cation (each of $R_1$ to $R_4$ is independently a hydrogen element or a hydrocarbon group with two or less carbon atoms) or a hydrocarbon cation with two or less carbon atoms, as A cation positioned in A site. Examples of the $R_1R_2R_3R_4N^+$ cation may include $NH_4^+$, $CH_3NH_3^+$, $(CH_3)_2NH_2^+$, and $CH_2H_5NH_3^+$. Meanwhile, examples of the hydrocarbon cation may include $CH_3^+$, and $CH_3CH_2^+$. The proportion of the $R_1R_2R_3R_4N^+$ cation or the hydrocarbon cation in A site is, for example, 70% or more, may be 90% or more, and may be 100%.

The crystal phase contains a divalent metal cation and a monovalent metal cation as B cation positioned in B site. The divalent metal cation is a cation of an arbitrary metal element that can take the valence of two among metal elements (excluding non-metal elements) in $2^{nd}$ to $16^{th}$ groups of the periodic table. Among them, the divalent metal cation is preferably a cation of an alkali earth metal element or a transition metal element, and more preferably a cation of an alkali earth metal element. Examples of the alkali earth metal element may include Be, Mg, Ca, Sr, Ba, and Ra. Above all, it is preferable that the crystal phase contains $Mg^{2+}$ as the divalent metal cation. The proportion of $Mg^{2+}$ in the divalent metal cation is, for example, 50 mol % or more, for example, may be 70 mol % or more, may be 90 mol % or more, and may be 100 mol %.

The monovalent metal cation is a cation of an arbitrary metal element that can take valence of one among metal elements (excluding non-metal elements) in $1^{st}$ to $16^{th}$ groups of the periodic table. Among them, the monovalent metal cation is preferably a cation of an alkali metal element, an alkali earth metal element, or a transition metal element, and is more preferably a cation of an alkali metal element. Examples of the alkali metal element may include Li, Na, K, Rb, and Cs. Above all, it is preferable that the crystal phase contains $Li^+$ as the monovalent metal cation. The proportion $Li^+$ in the monovalent metal cation is, for example, 50 mol % or more, for example, may be 70 mol % or more, may be 90 mol % or more, and may be 100 mol %.

The proportion of the monovalent metal cation to the total of the divalent metal cation and the monovalent metal cation is, for example, 1 mol % or more, may be 3 mol % or more, and may be 5 mol % or more. If the proportion of the monovalent metal cation is too small, there is a possibility that the F defect would not be generated inside the crystal phase and the ion conductivity might not improve. Meanwhile, the proportion of the monovalent metal cation is, for example, 40 mol % or less, and may be 30 mol % or less. If the proportion of the monovalent metal cation is too large, there is a possibility that the deformation of the crystal structure would be large and the ion conductivity might not improve. The proportion of the divalent metal cation and the monovalent metal cation in B site is, for example, 70% or more, may be 90% or more, and may be 100%.

The divalent metal cation is regarded as $B^{II}$ and the monovalent metal cation is regarded as $B^{I}$. When the crystal phase has a perovskite structure, the crystal phase preferably has a composition represented by $AB^{II}_{1-x}B^{I}_{x}F_{3-x}$ (0<x≤0.4); x is larger than 0, may be 0.01 or more, may be 0.03 or more, may be 0.05 or more, and may be 0.1 or more. Meanwhile, x is, for example, 0.4 or less, and may be 0.3 or less.

Also, when the crystal phase has a layered perovskite structure, the crystal phase preferably has a composition represented by $A_2B^{II}_{1-x}B^{I}_{x}F_{4-x}$ (0<x≤0.4); x is larger than 0, may be 0.01 or more, may be 0.03 or more, and may be 0.05 or more. Meanwhile, x may be 0.4 or less, may be 0.3 or less, and may be 0.2 or less.

There are no particular limitations on the composition of the solid electrolyte in the present disclosure if the composition can contain the crystal phase. Also, examples of the shape of the solid electrolyte may include a granular shape. Also, the average particle size ($D_{50}$) of the solid electrolyte is, for example, 0.1 μm or more, and may be 1 μm or more. Meanwhile, the average particle size ($D_{50}$) of the solid electrolyte is, for example, 50 μm or less, and may be 20 μm or less. The average particle size ($D_{50}$) of the solid electrolyte may be determined by, for example, the result of a particle distribution measurement by a laser diffraction scattering method. Also, the ion conductivity (50° C.) of the solid electrolyte is, for example, $0.5*10^{-6}$ S/cm or more, may be $1*10^{-6}$ S/cm or more, and may be $1*10^{-5}$ S/cm or more.

The solid electrolyte in the present disclosure can be used for an arbitrary application utilizing fluoride ion conductivity. Above all, the solid electrolyte is preferably used in a fluoride ion battery. Also, examples of the method for producing the solid electrolyte may include a solid phase reaction.

B. Fluoride Ion Battery

FIG. 1 is a schematic cross-sectional view illustrating an example of a fluoride ion battery in the present disclosure. Fluoride ion battery 10 comprises cathode active material layer 1 containing a cathode active material, anode active material layer 2 containing an anode active material, solid electrolyte layer 3 formed between cathode active material layer 1 and anode active material layer 2, cathode current collector 4 for collecting currents of cathode active material layer 1, anode current collector 5 for collecting currents of anode active material layer 2, and battery case 6 for storing these members. In the present disclosure, at least one of cathode active material layer 1, anode active material layer 2, and solid electrolyte layer 3 contains the above described solid electrolyte.

According to the present disclosure, usage of the above described solid electrolyte allows a fluoride ion battery to have, for example, excellent capacity properties.

1. Solid Electrolyte Layer

The solid electrolyte layer is a layer containing at least a solid electrolyte. Also, the solid electrolyte layer may contain just the solid electrolyte, and may further contain a binder.

The solid electrolyte included in the solid electrolyte layer is preferably the material described in "A. Solid electrolyte" above. It means that the solid electrolyte layer preferably contains the above described solid electrolyte.

Examples of the binder may include a fluorine-based binder such as polyvinylidene fluoride (PVDF) and polytetrafluoroethylene (PTFE). Also, the thickness of the solid electrolyte layer varies greatly with the constitution of a battery; thus is not particularly limited.

2. Cathode Active Material Layer

The cathode active material layer is a layer containing at least a cathode active material. Also, the cathode active material layer may further contain at least one of a solid electrolyte, a conductive material, and a binder, other than the cathode active material. Also, the solid electrolyte included in the cathode active material layer is preferably the material described in "A. Solid electrolyte" above. It means that the cathode active material layer preferably contains the above described solid electrolyte.

The cathode active material is usually an active material of which defluorination occurs during discharge. Examples of the cathode active material may include a simple substance of metal, an alloy, a metal oxide, and fluorides of these. Examples of the metal element included in the cathode active material may include Cu, Ag, Ni, Co, Pb, Ce, Mn, Au, Pt, Rh, V, Os, Ru, Fe, Cr, Bi, Nb, Sb, Ti, Sn, and Zn. Also, additional examples of the cathode active material may include a carbon material and the fluoride thereof. Examples of the carbon material may include graphite, coke, and carbon nanotube. Also, further additional examples of the cathode active material may include a polymer material and the fluoride thereof. Examples of the polymer material may include polyaniline, polypyrrole, polyacetylene, and polythiophene.

Examples of the conductive material may include a carbon material. Examples of the carbon material may include carbon black such as acetylene black, Ketjen black, furnace black and thermal black. Incidentally, the binder is in the same contents as those described above. Also, the thickness of the cathode active material layer varies greatly with the constitution of a battery; thus is not particularly limited.

3. Anode Active Material Layer

The anode active material layer is a layer containing at least an anode active material. Also, the anode active material layer may further contain at least one of a solid electrolyte, a conductive material and a binder, other than the anode active material. Also, the solid electrolyte included in the anode active material layer is preferably the material described in "A. Solid electrolyte" above. It means that the anode active material layer preferably contains the above described solid electrolyte.

The anode active material is usually an active material of which fluorination occurs during discharge. Also, an arbitrary active material having lower potential than that of the cathode active material may be selected as the anode active material. Thus, the above described cathode active material may be used as the anode active material. Examples of the anode active material may include a simple substance of metal, an alloy, a metal oxide, and the fluoride of these. Examples of the metal element included in the anode active material may include La, Ca, Al, Eu, Li, Si, Ge, Sn, In, V, Cd, Cr, Fe, Zn, Ga, Ti, Nb, Mn, Yb, Zr, Sm, Ce, Mg, and Pb. Also, the above described carbon material and polymer material may be used as the anode active material.

Incidentally, the conductive material and the binder are in the same contents as those described above. Also, the thickness of the anode active material layer varies greatly with the constitution of a battery; thus is not particularly limited.

4. Other Constitutions

The fluoride ion battery in the present disclosure has at least the above described anode active material layer, cathode active material layer and solid electrolyte layer; further, usually has a cathode current collector for collecting currents of the cathode active material layer and an anode current collector for collecting currents of the anode active material layer. Examples of the shape of the current collectors may include a foil shape, a mesh shape, and a porous shape.

5. Fluoride Ion Battery

The fluoride ion battery in the present disclosure may be a primary battery and may be a secondary battery, but preferably a secondary battery among them. The reason therefor is to be repeatedly charged and discharged and useful as a car-mounted battery for example. Incidentally, the secondary battery includes the usage of the secondary battery as a primary battery (usage for the purpose of just one time discharge after charging). Also, examples of the shape of the fluoride ion battery in the present disclosure may include a coin shape, a laminate shape, a cylindrical shape and a square shape.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

The present disclosure will be hereinafter described in more details with reference to Examples.

Example 1

A solid electrolyte having $NH_4Mg_{0.9}Li_{0.1}F_{2.9}$ crystal phase (perovskite type crystal phase) was synthesized by a solid phase reaction. The powder in which $3MgCO_3.Mg(OH)_2.3H_2O$, $LiNO_3$, and $NH_4F$ were weighed so as to be Mg:Li:F=0.9:0.1:7 in the molar ratio, was crushed and mixed for 40 minutes by hand milling in an Ar atmosphere. The obtained mixture powder was pressure powder molded and burned at 180° C. for 1 hour under Ar flow. After that, the product was crushed and mixed again by hand milling, the obtained mixture powder was pressure powder molded, and burned at 180° C. for 2 hours under Ar flow. After that, the product was crushed and mixed again by hand milling, and the powder was burned at 180° C. for 1 hour under Ar flow. Thereby, a solid electrolyte was obtained.

Example 2

A solid electrolyte was obtained in the same manner as in Example 1 except that $3MgCO_3.Mg(OH)_2.3H_2O$, $LiNO_3$, and $NH_4F$ were weighed so as to be Mg:Li:F=0.8:0.2:7 in the molar ratio.

Example 3

A solid electrolyte was obtained in the same manner as in Example 1 except that $3MgCO_3.Mg(OH)_2.3H_2O$, $LiNO_3$, and $NH_4F$ were weighed so as to be Mg:Li:F=0.7:0.3:7 in the molar ratio.

Comparative Example 11

A solid electrolyte was obtained in the same manner as in Example 1 except that $LiNO_3$ was not used, and $3MgCO_3.Mg(OH)_2.3H_2O$ and $NH_4F$ were weighed so as to be Mg:F=1:7 in the molar ratio.

Example 4

A solid electrolyte having $(NH_4)_2Mg_{0.95}Li_{0.05}F_{3.95}$ crystal phase (layered perovskite type crystal phase) was synthesized by a solid phase reaction. The powder in which $3MgCO_3.Mg(OH)_2.3H_2O$, $LiNO_3$, and $NH_4F$ were weighed so as to be Mg:Li:F=0.95:0.05:7 in the molar ratio, was crushed and mixed for 40 minutes by hand milling in an Ar atmosphere. The obtained mixture powder was pressure powder molded and burned at 160° C. for 1 hour under Ar flow. After that, the product was crushed and mixed again by hand milling, the obtained mixture powder was pressure powder molded, and burned at 160° C. for 1 hour under Ar flow. After that, the product was crushed and mixed again by hand milling, and the powder was burned at 140° C. for 3 hours under Ar flow. Thereby, a solid electrolyte was obtained.

Example 5

A solid electrolyte was obtained in the same manner as in Example 4 except that $3MgCO_3.Mg(OH)_2.3H_2O$, $LiNO_3$, and $NH_4F$ were weighed so as to be Mg:Li:F=0.9:0.1:7 in the molar ratio.

Example 6

A solid electrolyte was obtained in the same manner as in Example 4 except that $3MgCO_3.Mg(OH)_2.3H_2O$, $LiNO_3$, and $NH_4F$ were weighed so as to be Mg:Li:F=0.85:0.15:7 in the molar ratio.

Example 7

A solid electrolyte was obtained in the same manner as in Example 4 except that $3MgCO_3.Mg(OH)_2.3H_2O$, $LiNO_3$, and $NH_4F$ were weighed so as to be Mg:Li:F=0.8:0.2:7 in the molar ratio.

Comparative Example 2

A solid electrolyte was obtained in the same manner as in Example 4 except that $LiNO_3$ was not used, and $3MgCO_3.Mg(OH)_2.3H_2O$ and $NH_4F$ were weighed so as to be Mg:F=1:7 in the molar ratio.

Comparative Examples 3 and 4

$NH_4F$ and $MgF_2$ were respectively used as the solid electrolyte for comparison.

[Evaluation]

XRD Measurement

A powder X-ray diffraction (powder XRD) measurement using a CuKα ray was conducted for the solid electrolytes obtained in Examples 1 to 7 and Comparative Examples 1 and 2. The results of Examples 1 to 3 and Comparative Example 1 are shown in FIG. 2, and the results of Examples 4 to 7 and Comparative Example 2 are shown in FIG. 3.

Figure 2:
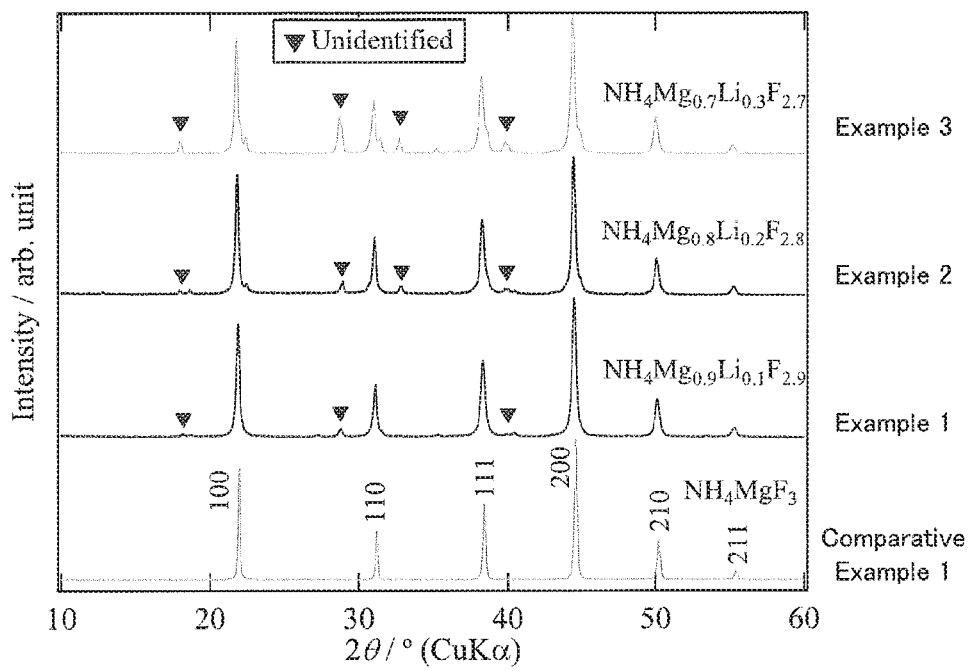
FIG. 2 is the result of an XRD measurement for the solid electrolytes obtained in Examples 1 to 3 and Comparative Example 1.

As shown in FIG. 2, it was confirmed that Examples 1 to 3 had a perovskite type crystal phase similarly to Comparative Example 1. In Comparative Example 1, typical peaks were confirmed at θ=21.97°, 31.19°, 38.42°, 44.64°, 50.23°, and 55.39°. The typical peaks of a perovskite type crystal phase were also confirmed in Examples 1 to 3 in the same manner as in Comparative Example 1. Also, in Examples 1 to 3, it was confirmed that unknown peak slightly increased as the substitution amount of Li (Li content) increased. The perovskite type crystal phase was obtained in almost a single phase in Examples 1 and 2, and the perovskite type crystal phase was obtained as the main phase in Example 3. Also, when the intensity of the peak in the vicinity of $2\theta=44.64°$ in the perovskite type crystal phase is regarded as $I_A$ and the intensity of the unknown peak in the vicinity of $2\theta=29°$ is regarded as $I_B$, the value of $I_B/I_A$ was 0.076 in Example 1, 0.12 in Example 2, and 0.28 in Example 3. Incidentally, the value of $I_B/I_A$ is preferably small. It means that $I_B/I_A$ is preferably the above value or less.

Figure 3:
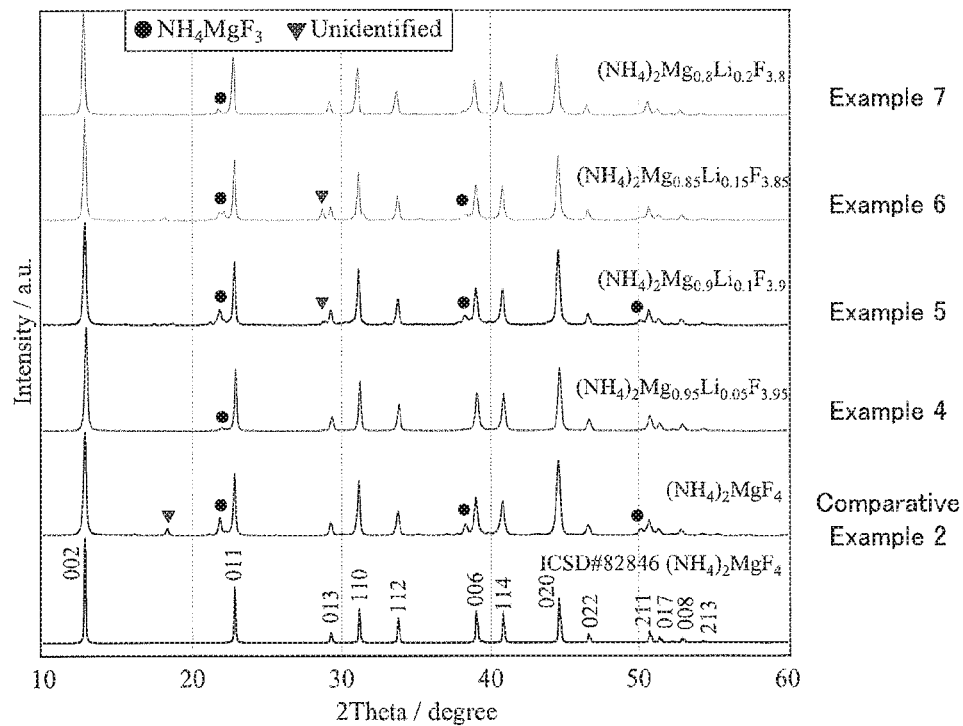
FIG. 3 is the result of an XRD measurement for the solid electrolytes obtained in Examples 4 to 7 and Comparative Example 2.

Meanwhile, as shown in FIG. 3, it was confirmed that Examples 4 to 7 had a layered perovskite type crystal phase similarly to Comparative Example 2. In Comparative Example 2, typical peaks were confirmed at $2\theta=12.80°$, $22.82°$, $29.29°$, $31.15°$, $33.79°$, $38.31°$, $40.81°$, $44.61°$, $46.59°$, $50.69°$, $52.84°$, and $54.28°$. The typical peaks of a layered perovskite type crystal phase were also confirmed in Examples 4 to 7 in the same manner as in Comparative Example 2. Incidentally, the peak of a perovskite type crystal phase was also slightly confirmed in Examples 4 to 7. Also, it was confirmed that the unknown peak slightly increased as the substitution amount of Li (Li content) increased in Examples 4 to 7. The layered perovskite type crystal phase was obtained in almost a single phase in Examples 4 to 7. Also, when the intensity of the peak in the vicinity of $2\theta=12.80°$ in the layered perovskite type crystal phase is regarded as $I_C$ and the intensity of the unknown peak in the vicinity of $2\theta=29°$ is regarded as $I_B$, the value of $I_B/I_C$ was 0 in Example 4, 0.056 in Example 5, 0.13 in Example 6, and 0 in Example 7. Incidentally, the value of $I_B/I_C$ is preferably small. It means that $I_B/I_C$ is preferably the above value or less. Also, when the intensity of the peak in the vicinity of $2\theta=21.97°$ in the perovskite type crystal phase is regarded as $I_D$, the value of $I_D/I_C$ was 0.044 in Example 4, 0.17 in Example 5, 0.10 in Example 6, and 0.085 in Example 7. Incidentally, the value of $I_D/I_C$ is preferably small. It means that $I_D/I_C$ is preferably the above value or less.

Ion Conductivity Measurement

Figure 4:
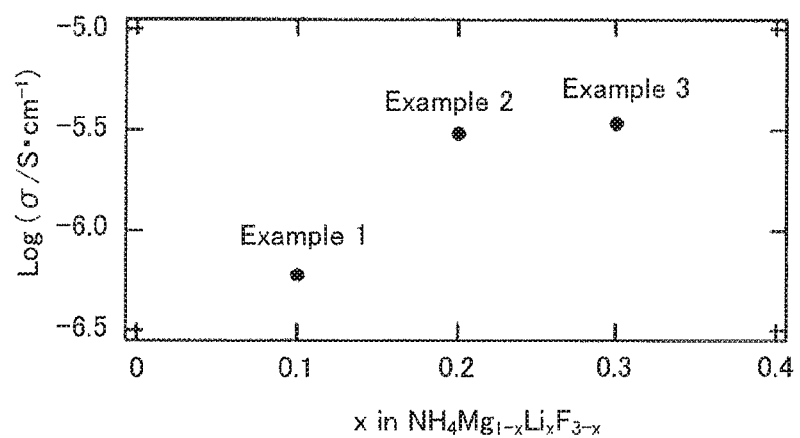
FIG. 4 is the result of an ion conductivity measurement for the solid electrolytes obtained in Examples 1 to 3.
Figure 5:
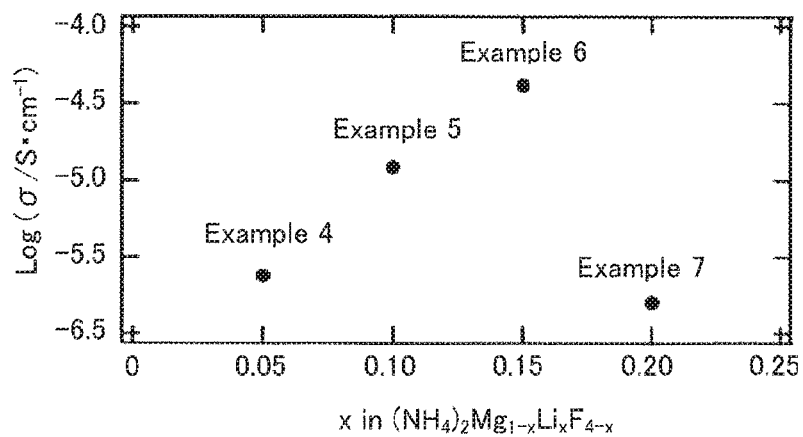
FIG. 5 is the result of an ion conductivity measurement for the solid electrolytes obtained in Examples 4 to 7.

The ion conductivity of the solid electrolytes obtained in Examples 1 to 7 and Comparative Examples 1 and 2 was evaluated using an alternating current impedance method. The solid electrolyte was molded by uniaxial pressing and then isostatic pressing (200 MPa, 10 minutes) was conducted thereto to fabricate a pressurized powder body. The relative density of the obtained pressurized powder body was 75%. Gold electrodes were formed in film by sputtering on the both surfaces of the pressurized powder body. An impedance measurement was conducted to the obtained sample. The measurement environment was in a vacuum environment of 100 Pa or less, and the measurement was conducted in the range from a room temperature to 150° C. Also, the conditions for the impedance measurement were frequency of 1 M to 1 Hz and potential amplitude of 20 mV. The ion conductivity (S/cm) was calculated from the fluoride ion conductivity resistance measured in the impedance measurement, the thickness of the sample and the electrode area. The ion conductivity at 50° C. is shown in Table 1, FIG. 4 and FIG. 5.

TABLE 1

| | Structure | Composition | Ion conductivity at 50° C. S/cm |
|---|---|---|---|
| Comparative Example 1 | Perovskite | $NH_4MgF_3$ | $10^{-10}$ or less |
| Example 1 | Perovskite | $NH_4Mg_{0.9}Li_{0.1}F_{2.9}$ | $5.98 * 10^{-7}$ |
| Example 2 | Perovskite | $NH_4Mg_{0.8}Li_{0.2}F_{2.8}$ | $3.04 * 10^{-6}$ |
| Example 3 | Perovskite | $NH_4Mg_{0.7}Li_{0.3}F_{2.7}$ | $3.41 * 10^{-6}$ |
| Comparative Example 2 | Layered perovskite | $(NH_4)_2MgF_4$ | $10^{-10}$ or less |
| Example 4 | Layered perovskite | $(NH_4)_2Mg_{0.95}Li_{0.05}F_{3.95}$ | $2.36 * 10^{-6}$ |
| Example 5 | Layered perovskite | $(NH_4)_2Mg_{0.9}Li_{0.1}F_{3.9}$ | $1.22 * 10^{-5}$ |
| Example 6 | Layered perovskite | $(NH_4)_2Mg_{0.85}Li_{0.15}F_{3.85}$ | $4.17 * 10^{-5}$ |
| Example 7 | Layered perovskite | $(NH_4)_2Mg_{0.8}Li_{0.2}F_{3.8}$ | $1.60 * 10^{-6}$ |
| Comparative Example 3 | — | $NH_4F$ | $10^{-10}$ or less |
| Comparative Example 4 | — | $MgF_2$ | $10^{-10}$ or less |

As shown in Table 1, the ion conductivity at 50° C. in Comparative Example 1 was low, which was $10^{-10}$ S/cm or less. On the other hand, the ion conductivity of $10^{-7}$ S/cm or more was confirmed in Examples 1 to 3, and significant improvement of the ion conductivity was confirmed. In particular, the ion conductivity of $10^{-6}$ S/cm or more was confirmed in Examples 2 and 3. It means that high ion conductivity was confirmed when the proportion of the monovalent metal cation ($Li^+$) to the total of the divalent metal cation ($Mg^{2+}$) and the monovalent metal cation ($Li^+$) was 10 mol % or more and 20 mol % or less.

Also, as shown in Table 1, the ion conductivity at 50° C. in Comparative Examples 2 to 4 was low, which was $10^{-10}$ S/cm or less. On the other hand, the ion conductivity of $10^{-6}$ S/cm or more was confirmed in Examples 4 to 7, and significant improvement of the ion conductivity was confirmed. In particular, the ion conductivity of $10^{-5}$ S/cm or more was confirmed in Examples 5 and 6. It means that high ion conductivity was confirmed when the proportion of the monovalent metal cation ($Li^+$) to the total of the divalent metal cation ($Mg^{2+}$) and the monovalent metal cation ($Li^+$) was 10 mol % or more and 15 mol % or less.

When Examples 4 to 7 (layered perovskite) are compared to Examples 1 to 3 (perovskite), the ion conductivity of the former was higher. The reason therefor is presumed that the conductive path inside the rock salt layer in the layered perovskite was utilized. It can be explained in details that while the perovskite has only the perovskite layer, the layered perovskite has the structure in which the perovskite layer and the rock salt layer are alternately disposed. It is presumed that the ion conductivity was higher because the layered perovskite utilized the conductive path inside the rock salt layer (such as the conductive path that goes through metastable F site) in addition to the conductive path inside the perovskite layer.

Incidentally, although not illustrated, when the ion conductivity in the solid electrolytes obtained in Examples 1 to 7 was checked, similarly to many of known solid electrolytes, it was confirmed that the ion conductivity increased as the temperature rose and the behavior based on the Arrhenius' equation was shown.

REFERENCE SIGNS LIST 1 cathode active material layer
2 anode active material layer 3 solid electrolyte layer
4 cathode current collector
5 anode current collector
6 battery case
10 fluoride ion battery

What is claimed is:

1. A solid electrolyte including fluoride ion conductivity, the solid electrolyte comprising:
   a crystal phase having a perovskite structure or a layered perovskite structure;
   the crystal phase contains A cation positioned in A site, B cation positioned in B site, and a fluoride ion;
   the A cation contains $R_1R_2R_3R_4N^+$ cation (each of $R_1$ to $R_4$ is independently a hydrogen element or a hydrocarbon group with two or less carbon atoms) or a hydrocarbon cation with two or less carbon atoms; and
   the B cation contains a divalent metal cation and a monovalent metal cation.

2. The solid electrolyte according to claim 1, wherein the A cation comprises the $R_1R_2R_3R_4N^+$ cation.

3. The solid electrolyte according to claim 1, wherein the divalent metal cation comprises a cation of an alkali earth metal element.

4. The solid electrolyte according to claim 1, wherein the monovalent metal cation comprises a cation of an alkali metal element.

5. The solid electrolyte according to claim 1, wherein the divalent metal cation comprises $Mg^{2+}$ and the monovalent metal cation comprises $Li^+$.

6. The solid electrolyte according to claim 1, wherein a proportion of the monovalent metal cation to a total of the divalent metal cation and the monovalent metal cation is 30 mol % or less.

7. A fluoride ion battery comprising a cathode active material layer containing a cathode active material, an anode active material layer containing an anode active material, and a solid electrolyte layer formed between the cathode active material layer and the anode active material layer; and
   at least one of the cathode active material layer, the anode active material layer, and the solid electrolyte layer contains the solid electrolyte according to claim 1.

* * * * *